(12) United States Patent
Harada

(10) Patent No.: US 6,934,628 B2
(45) Date of Patent: Aug. 23, 2005

(54) NAVIGATION APPARATUS, NAVIGATION METHOD AND NAVIGATION SOFTWARE

(75) Inventor: Tomohiro Harada, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 107 days.

(21) Appl. No.: 10/140,298

(22) Filed: May 8, 2002

(65) Prior Publication Data

US 2002/0169547 A1 Nov. 14, 2002

(30) Foreign Application Priority Data

May 14, 2001 (JP) .................................... P. 2001-143803

(51) Int. Cl.[7] .......................... G01C 21/00; G01C 21/34
(52) U.S. Cl. ...................... 701/211; 701/208; 701/200; 701/23; 701/25; 701/28; 340/988; 340/990; 340/995; 73/178 R
(58) Field of Search ................................ 701/211, 208, 701/200, 23, 25, 28; 340/988, 990, 995; 73/178 R

(56) References Cited

U.S. PATENT DOCUMENTS

| | | | | |
|---|---|---|---|---|
| 4,951,212 | A | | 8/1990 | Kurihara et al. |
| 5,887,269 | A | * | 3/1999 | Brunts et al. ................ 701/208 |
| 5,948,040 | A | * | 9/1999 | DeLorme et al. ........... 701/201 |
| 5,964,821 | A | * | 10/1999 | Brunts et al. ................ 701/201 |
| 6,122,592 | A | | 9/2000 | Arakawa et al. |
| 6,249,740 | B1 | * | 6/2001 | Ito et al. ....................... 701/200 |
| 6,278,940 | B1 | * | 8/2001 | Endo ............................ 701/209 |
| 6,321,158 | B1 | * | 11/2001 | DeLorme et al. ........... 701/201 |
| 6,415,224 | B1 | * | 7/2002 | Wako et al. ................. 701/208 |
| 6,427,118 | B1 | * | 7/2002 | Suzuki ........................ 701/209 |
| 6,434,482 | B1 | * | 8/2002 | Oshida et al. .............. 701/209 |
| 6,456,932 | B2 | * | 9/2002 | Yagyu ......................... 701/209 |
| 6,535,812 | B2 | * | 3/2003 | Satoh et al. ................ 701/208 |
| 6,553,310 | B1 | * | 4/2003 | Lopke ......................... 701/213 |
| 6,618,669 | B2 | * | 9/2003 | Ota et al. .................... 701/208 |
| 2003/0036848 | A1 | * | 2/2003 | Sheha et al. ................ 701/209 |
| 2003/0182052 | A1 | * | 9/2003 | DeLorme et al. ........... 701/201 |
| 2004/0024525 | A1 | * | 2/2004 | Maruyama ................... 701/211 |
| 2004/0030493 | A1 | * | 2/2004 | Pechatnikov et al. ....... 701/208 |
| 2004/0039523 | A1 | * | 2/2004 | Kainuma et al. ........... 701/208 |
| 2004/0107043 | A1 | * | 6/2004 | de Silva ...................... 701/200 |

* cited by examiner

*Primary Examiner*—Olga Hernandez
(74) *Attorney, Agent, or Firm*—McGinn & Gibb, PLLC

(57) ABSTRACT

The technology comprises a CD/DVD-ROM controller for storing in advance the map information to show the names of roads and facilities located in respective areas, a current position detector for detecting the current position of the vehicle, a position specification section for specifying any position on the map, a retrieval section for retrieving facilities of a plurality of genres around a specified position based on the map information, an extraction section for extracting retrieved facilities in increasing order of distance to the specified position, a display 10 for displaying extracted facilities on the map based on the map information, a route setting section 42 for calculating/setting the route from the current position to a destination based on the map information by selecting any one of the displayed facilities as the destination, and a guidance section for guiding the vehicle along the specified route.

27 Claims, 4 Drawing Sheets

NAVIGATION APPARATUS, NAVIGATION METHOD AND NAVIGATION SOFTWARE

BACKGROUND OF THE INVENTION

The present invention relates to a navigation technology, and in particular to a navigation technology equipped with an improved feature to retrieve facilities around a particular point on a map.

Recently, with the diffusion of automobiles and development of information processing technologies, a navigation apparatus mounted on a vehicle for making guidance has been in rapid use. A navigation apparatus calculates and sets optimum route to a specified destination based on map information representing roads and makes guidance where to turn right/left via map display and synthesized voice while sequentially detecting the location of the vehicle by way of the GPS and the self-contained navigation.

To activate guidance by a navigation apparatus, the user must set a destination. Setting of the destination is made by specifying a particular point on a displayed map by using a cursor. It is also possible to retrieve a destination based on the search criteria such as the area and name. The navigation apparatus also has a feature to retrieve peripheral facilities around the position of the vehicle or a particular point based on the category (hereinafter referred to as genre) of the facility and display the facilities in increasing order of distance to the vehicle position or particular point.

Retrieval of peripheral facilities is made for example by narrowing down listed names by genre, retail store, food and convenience store in this order. It is possible to allocate icons to individual facilities depending on the category and display an icon in a list display as a guide to select the target facility. Icons allocated in this way are displayed also when facilities are displayed on a map. Such an icon may be used to check the location and category of the target facility.

Aforementioned retrieval of facilities around a current point or an arbitrary point in a car navigation apparatus is made by the user selecting a genre and narrowing down the search criteria in the genre. Thus only the facilities in the genre are listed. To retrieve facilities over a plurality of genres, the same retrieval operation procedure must be repeated for individual genres.

For example, to retrieve a convenience store and a family-style restaurant around a parking lot as a destination, the user must retrieve a convenience store in the order retail store, food and convenience store, then a family-style restaurant in the order of genre, restaurant, and family-style restaurant. This is troublesome to the user.

SUMMARY OF THE INVENTION

The invention is proposed to solve the aforementioned related art problems and aims at providing a navigation technology, that is, a navigation apparatus, a navigation method and a navigation software whereby facilities of a plurality of categories near a particular position on a map can be retrieved in a short time and displayed.

In order to attain the aforementioned object, a navigation apparatus according to the first aspect of the invention is characterized in that the navigation apparatus comprises map information storage section for storing in advance the map information to show the names of roads and facilities located in respective areas, current position detecting section for detecting the current position of the vehicle, position specification section for specifying any position on the map that is based on the map information, retrieval section for retrieving facilities of a plurality of categories around the specified position based on the map information, extracting section for extracting retrieved facilities in increasing order of distance to the specified position, facility display section for displaying facilities extracted by the extracting section on the map based on the map information, route setting section for calculating and setting the route from the current position to a destination by selecting any facility displayed on the facility display section as the destination based on the map information, and guidance section for guiding the vehicle along the specified route.

A navigation method according to the sixth aspect of the invention is the first aspect of the invention proposed from the viewpoint of method and characterized in that the method comprises a step of storing in advance the map information to show the names of roads and facilities located in respective areas, a step of detecting the current position of the vehicle, a step of specifying any position on the map that is based on the map information, a step of retrieving facilities of a plurality of categories around the specified position based on the map information, a step of extracting retrieved facilities in increasing order of distance to the specified position, a step of displaying facilities extracted by the extracting section on the map based on the map information, a step of calculating and setting the route from the current position to a destination by selecting any facility displayed as the destination based on the map information, and a step of guiding the vehicle along the specified route.

A navigation software according to the ninth aspect of the invention is the first and sixth aspects of the invention proposed from the viewpoint of computer software and characterized in that the software controls a computer to store in advance the map information to show the names of roads and facilities located in respective areas, detect the current position of the vehicle, specify any position on the map that is based on the map information, retrieve facilities of a plurality of categories around the specified position based on the map information, extract retrieved facilities in increasing order of distance to the specified position, display extracted facilities on the map based on the map information, calculate and set the route from the current position to a destination by selecting any facility displayed as the destination based on the map information, and guide the vehicle along the specified route.

In the first, sixth and ninth aspects of the invention, it is possible to display facilities of a plurality of categories around the specified position in increasing order of distance to the specified position, thus saving effort and time for retrieval of peripheral facilities and allowing quick setting of the destination of route calculation.

The second aspect of the invention is a navigation apparatus according to the first aspect of the invention, further comprising category setting section for setting categories of facilities to be retrieved.

The seventh aspect of the invention is the second aspect of the invention proposed from the viewpoint of method and characterized in that the method comprises a step of setting categories of facilities to be retrieved.

According to the second and seventh aspect of the invention, the user can preset categories of facilities to be retrieved/extracted so that the user can speed up the retrieval and extraction and quickly obtain information on the target facility by narrowing down the search by the facility category frequently used.

The third aspect of the invention is a navigation apparatus according to the first or second aspect of the invention, characterized in that the position specified by the specification section is set to be the current position of the vehicle detected by the current position detecting section.

The eighth aspect of the invention is the third aspect of the invention proposed from the viewpoint of method and a navigation method according to the sixth or seventh navigation method characterized in that the method comprises a step of setting a position on the map as the current position of the vehicle.

According to the third and eighth aspects of the invention, the current position of the vehicle as a start point of ordinary route guidance is automatically selected as a reference position for retrieval and extraction of peripheral facilities. This eliminates the user's effort to specify a position.

The fourth aspect of the invention is a navigation apparatus according to any one of the first through third aspects of the invention, further comprising list display section for displaying a list of the facility categories and destination setting section for setting a facility as a destination of route setting by the route setting section based on the category names in the list displayed on the list display section.

According to the fourth aspect of the invention, it is possible to set a destination based on the listed category names thus relieving the user of the operation load of specifying the position of a target facility on the map.

The fifth aspect of the invention is a navigation apparatus according to any one of the first through fourth aspects of the invention, further comprising a selection section for selecting a category name in the list displayed on the list display section, characterized in that the facility display section is adapted to display a facility closest to the current position of the vehicle except the currently displayed facility out of the facilities corresponding to the category names selected by the selection section.

According to the fifth aspect of the invention, the user has only to select a corresponding category name to display the facility next closest to the current position of the vehicle even when the user does not like the closest facility, thus allowing the user to select a facility most favored by the user.

DETAILED DESCRIPTION OF THE PREFERRED EMBODIMENTS

The embodiment of the invention (hereinafter simply referred to as "the embodiment") will be described in details referring to figures. This embodiment is implemented by using software to control a computer where hardware and software may be implemented in various ways. Thus, a virtual circuit block to implement the features of the invention and the embodiment is used in the following description.

[1. Configuration]

This embodiment relates to a navigation apparatus according to the invention (hereinafter referred to as "this apparatus") and a navigation method executed on this apparatus which may be understood as navigation software itself and a recording medium such as a CD-ROM, flash memory and ROM package where such software is recorded. For example, downloading such software to the navigation apparatus on each vehicle via a communications network such as a cell phone network for later execution is one aspect of the invention.

[1-1. General Configuration]

Figure 1:
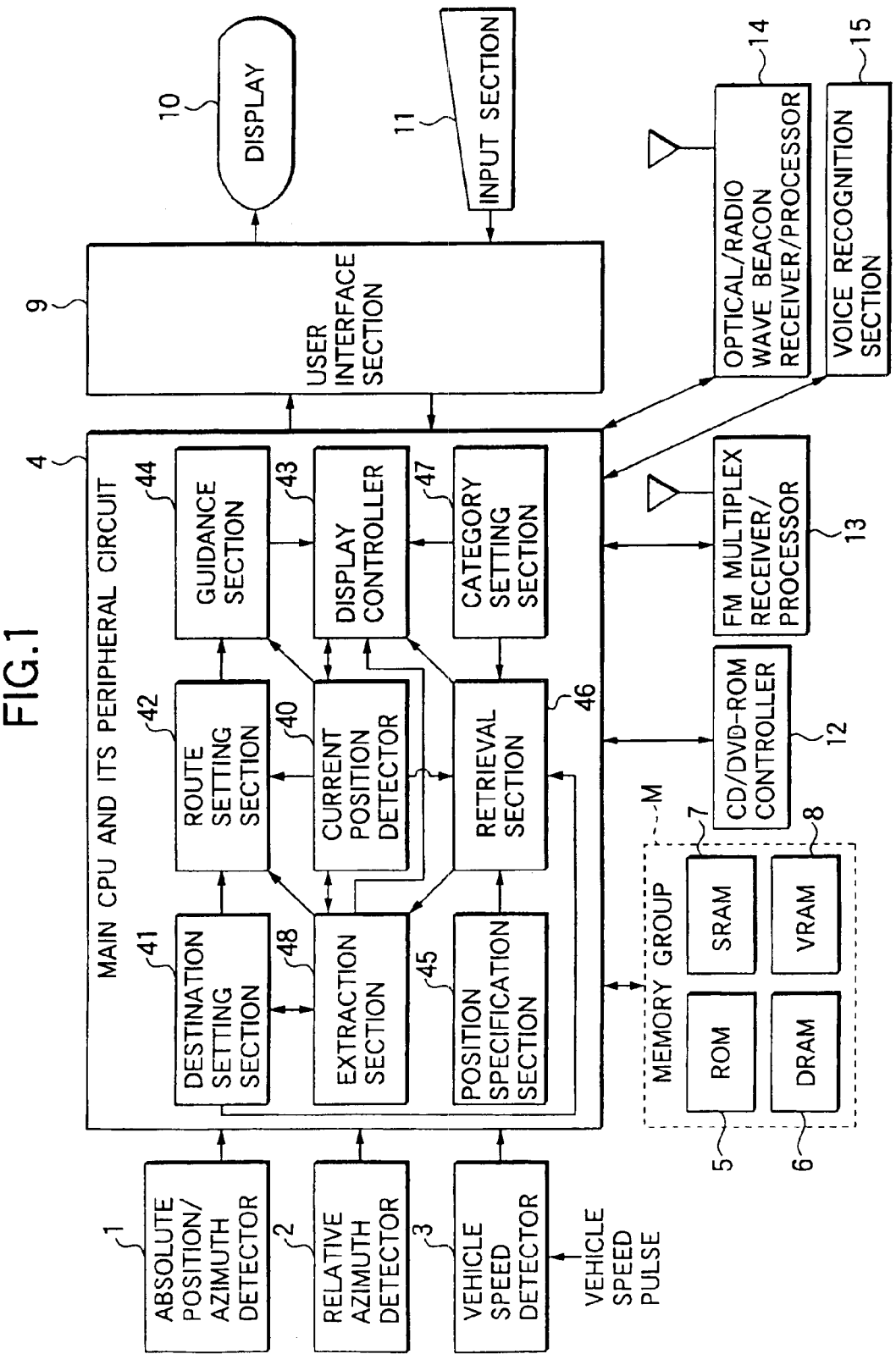
FIG. 1 is a functional block diagram showing the configuration of the embodiment of the invention.

This apparatus comprises the following elements shown in the functional block diagram of FIG. 1. An absolute position/azimuth detector 1 is a section that receives for example a GPS radio wave sent from GPS satellites via an antenna or receiver in order to calculates the absolute position coordinates and azimuth of the current position of an automobile where this apparatus is mounted (called the vehicle), or current position of the vehicle on the earth. A relative azimuth detector 2 is a section that detects the relative azimuth of the vehicle by using a gyro sensor. A vehicle speed detector 3 is a section that calculates the speed of the vehicle by processing the vehicle speed pulse obtained from the vehicle.

A main CPU and its peripheral circuit 4 is a section that plays the role of a control circuit to control the entire apparatus. A memory group M is a variety of memories required for operation of this apparatus. For example, a ROM 5 for program storage is accessed by the main CPU at activation of this apparatus. To a dynamic RAM (DRAM) 6 for providing a work area is loaded a main program. An SRAM 7 for making backup of the information such as setting information is backed up by a battery while the main power is off and provides memory data when the main power is turned on. A VRAM 8 for display stores bitmap data of an image to be displayed on a display 10.

A display 10 is a section that outputs various information such as a map and an operation menu on a liquid crystal display or via synthesized voice announcements. An input section 11 is a section used by the user to input information such as an instruction from a switch and allows a position on a map to be specified and menu/list selections to be specified. A touch panel provided on the display 10 also functions as an input section 11. A user interface section 9 is a user interface that links the display 10 and the input section 11 and the main CPU and its peripheral circuit 4 by using an I/O control circuit and a device driver.

A CD/DVD-ROM controller 12 is section for reading various information recorded on a CD-ROM and a DVD-ROM and storing in advance the map information to show the names of roads and facilities located in respective areas. Such map information includes for example roads, icons (including a current position mark and a land mark), text data, image data used to display menus and lists, and route data used to calculate the optimum route from the current position to the destination. For facilities, respective point coordinates of facilities are included as well as a retrieval database related to genres such as a convenience store, gas station, bank, liquor/cigarette shop, hospital and pharmacy.

An FM multiplex receiver/processor 13 is a section that receives an FM broadcast wave and extract desired data such as traffic information of the VICS service from this broadcast wave, the traffic information including traffic jam information. An optical/radio wave beacon receiver/processor 14 is a section that receives/processes information such as identification information of each beacon and traffic information of the VICS service from an optical beacon or radio wave beacon provided on a road shoulder. A voice recognition section 15 is a section that recognizes words such as instruction words from the input voice of the user.

[1-2. Roles of Main CPU and its Peripheral Circuit]

A main CPU and its peripheral circuit 4 is adapted to play the role of each section shown in FIG. 1 as mentioned below by way of the action of software mentioned earlier. A current position detector 40 is section for calculating the current position of the vehicle or vehicle position and in particular is adapted to calculate the vehicle position by combining the GPS navigation positioning and the self-contained navigation positioning.

The GPS navigation-positioning calculates the current position of the vehicle by using the information obtained from the absolute position/azimuth detector 1 based on a radio wave coming from artificial satellites. The self-contained navigation positioning calculates the current position of the vehicle by using the information obtained from the relative azimuth detector 2 and the vehicle speed detector 3 based on the earth magnetism and the speed of the vehicle.

A destination setting section 41 is specification section for specifying a destination facility out of the facilities contained in aid map information. A route setting section 42 is section for calculating/setting the route to the specified destination. A display controller 43 is section for controlling display of information necessary for navigation such as roads, icons, menus and lists. A guidance section 44 is section for guiding the vehicle via screen display and synthesized voice based on the specified route.

A position specification section 45 is section for specifying a particular position on the display map as a reference point of retrieval of peripheral facilities. The position specified is automatically set to be the current position detected by the current position detector 40 in case no user specification is made from the input section 11.

A retrieval section 46 is section for retrieving facilities of a plurality of genres around a position specified by the position specification section 45 based on the databases on route information and facilities recorded on a CD-ROM and DVD-ROM. In the retrieval procedure, the maximum distance of a target facility from the specified position may be arbitrarily set, for example, within the radius of several kilometers or within the maximum range displayed on the display screen. A category setting section 47 is section for setting the genre of a facility retrieved by the retrieval section 46 in accordance with the input from the input section 11. This genre may be arbitrarily set by the user but may be defaulted to a predetermined genre in the absence of the user's specification. An extraction section 48 is for extracting facilities retrieved by the retrieval section 46 for each genre or a particular genre, in order of increasing distance to the position specified by the position specification section 45.

[2. Action]

Figure 2:
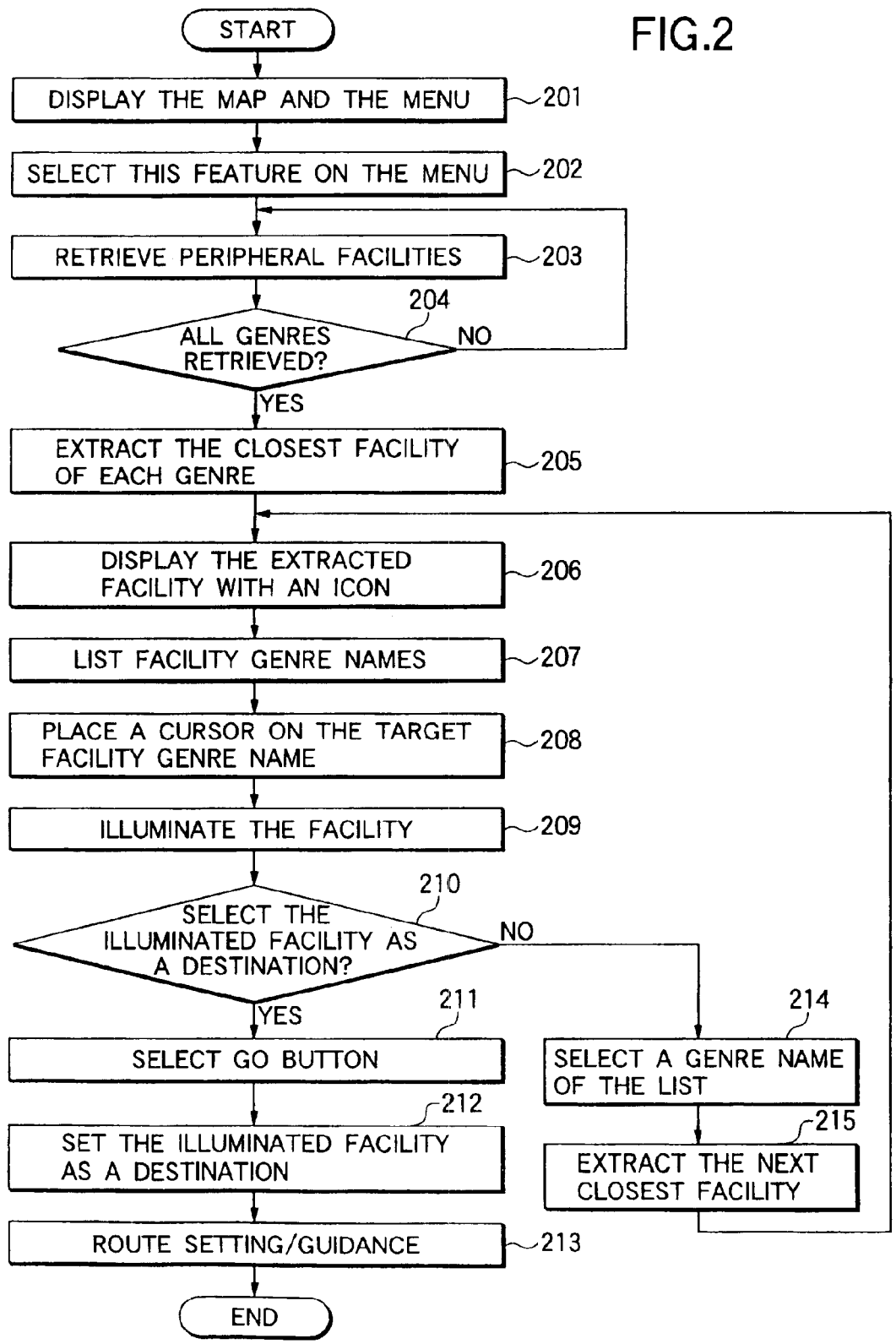
FIG. 2 is a flowchart showing the processing procedure in the embodiment of the invention.
Figure 3:
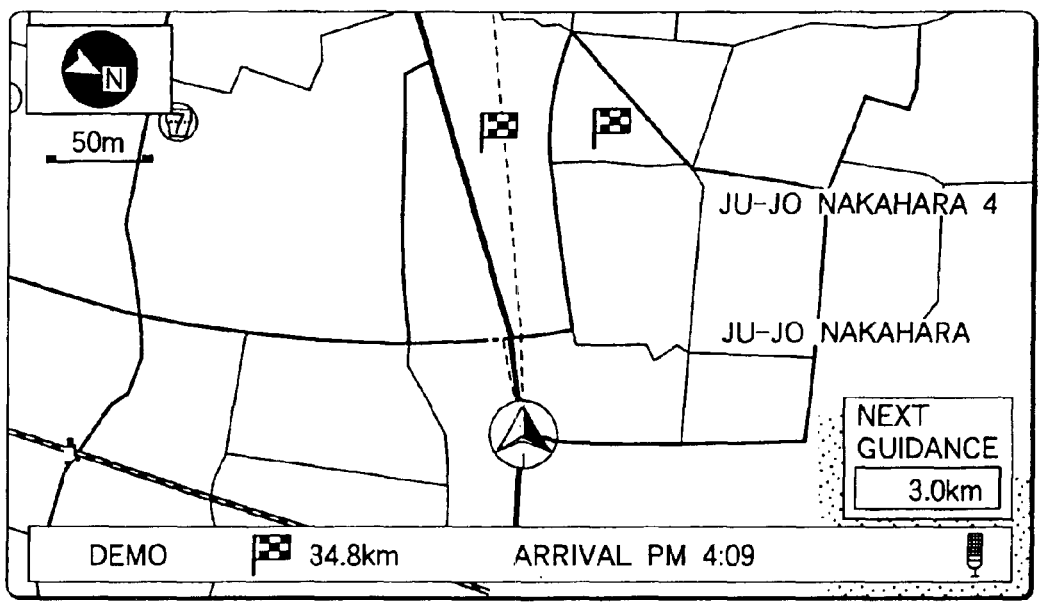
FIG. 3 shows an example of an ordinary map display screen in the embodiment of the invention.
Figure 4:
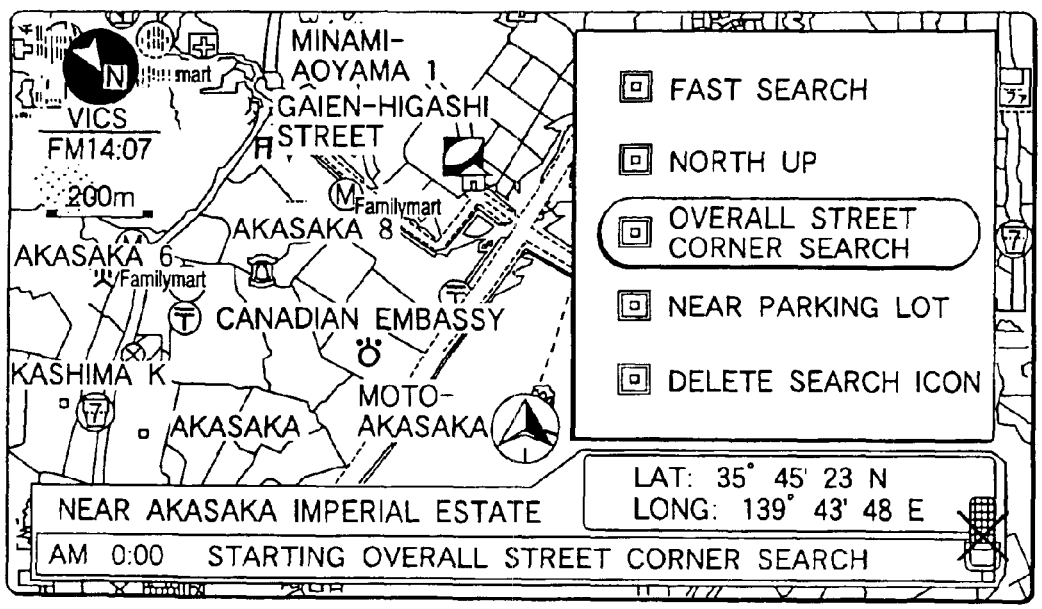
FIG. 4 shows an example of a menu button display screen in the embodiment of the invention.
Figure 5:
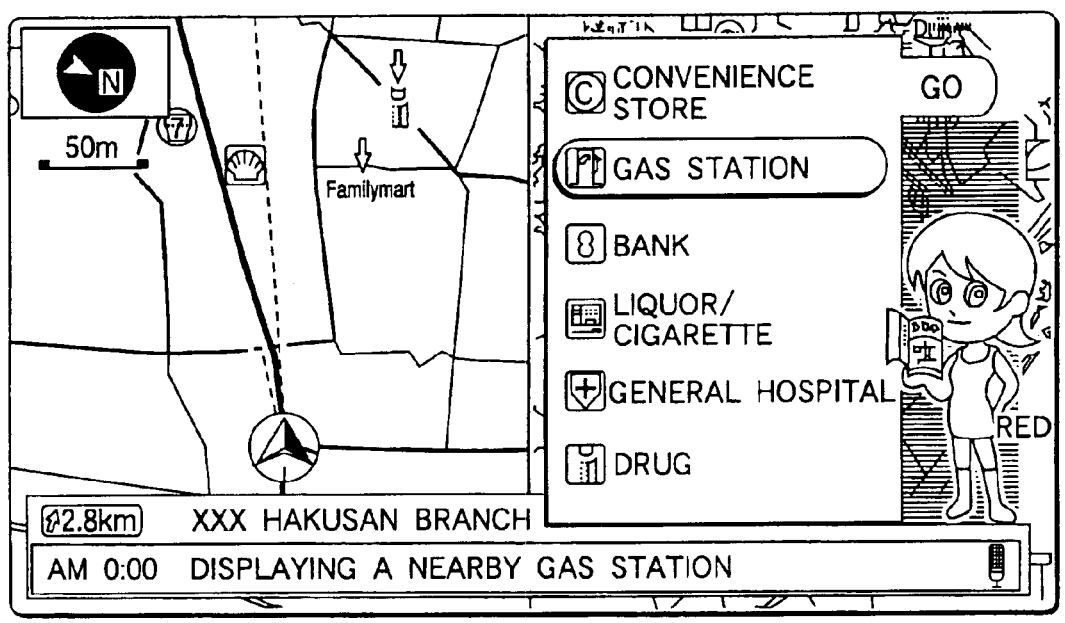
FIG. 5 shows an example of a display screen of illuminated facility icons and genre list in the embodiment of the invention.

Processing procedure in this embodiment configured as mentioned earlier will be described referring to the flowchart of FIG. 2 and the screen examples in FIGS. 3 through 5. As illustrated in FIG. 3, when the user instructs menu display from the input section 11 while a map of the current position of the vehicle and the peripheral area is on the display 10, the display controller 43 causes the display 10 to display the menus (step 201). Out of these menus, the user selects a feature corresponding to this embodiment (for example named "overall street corner search" in FIG. 4) (step 202). The retrieval section 46, based on the map information, retrieves any one of the facilities corresponding to a genre specified by the category setting section 47 out of the facilities around the current position and reads the data onto memory (step 203). This step is repeated as many as the specified genres (step 204).

In case all the specified genres are searched (step 204), the extraction section 48 extracts facilities of individual genres closest to the current position one by one (step 205). The display controller 43, as shown in FIG. 5, displays as an icon the extracted facility based on its coordinates on the map (step 206). The genre names of the retrieved facilities are listed (step 207). When the user places a cursor on the desired genre name from the displayed list (step 208), the facilities corresponding to the genre is illuminated (step 209). For example, a gas station is enclosed by a square in FIG. 5.

As well as the illuminated facility name, the distance from the current position to the facility and the direction (an arrow in FIG. 5) are calculated and displayed based on the map information. If wishing to select this facility as a destination (step 210), the user selects "Go" button on the right of the list (step 211) and the destination setting section 41 sets the illuminated facility as a destination (step 212). Then, route calculation by the route setting section 42 and navigation by the guidance section 44 follow (step 213). These steps are not described because they belong to an ordinary navigation procedure.

If wishing to check a facility closest to the current position except the illuminated facility in step 201, the user selects the genre name in the list (step 214). The extraction section 48 extracts the next closest facility out of the facilities of the genre from the data read onto memory (step 215). The subsequent procedure is the sane as steps 206 through 213.

[3. Advantage]

As mentioned hereabove, according to this embodiment, it is possible to automatically retrieve facilities of a plurality of genres close to the user's current position and display the facilities closest to the current position. This considerably saves the time and effort of checking a plurality of genres. It is possible to display facilities of a plurality of genres in increasing order of distance to the current position thus facilitating facilities most favored by the user. Even when the user does not like the closest facility, the user has only to select a corresponding category name to display the facility next closest to the current position, thus allowing the user to select a facility most favored by the user.

The user can set the genres of facilities to be retrieved/ extracted in advance, so that the user can speed up the processing and facilitate an access to a desired facility by setting genres frequently used and retrieving/extracting only necessary facilities.

In case the user skips setting, the current position as a start point of an ordinary navigation is automatically selected as a reference point of retrieval/extraction of peripheral facilities. This saves the user's effort of specifying a target position. Selecting the Go button on the right of the genre names in the list sets a destination facility. This relieves the user of the operation load of specifying the position of a target facility on the map.

[Other Embodiments]

The invention is not limited to the aforementioned embodiments but includes other embodiments such as those described below. For example, genres (categories) and number of categories of facilities to be retrieved/extracted are not limited by the aforementioned embodiments. By way of example, facilities such as a park and natural object as well as artificial facilities including buildings are accepted. The concept of "category" as search criteria may be narrow or wide and is not limited by the foregoing examples. Various expressions including wider expressions such as a building and a park as well as narrower expressions such as a company name, branch name and branch office name are accepted.

The position as a reference of retrieval/extraction of peripheral facilities is not limited to the current position. For example, setting is allowed where, in case the user has specified a destination displayed through temporary destination retrieval or a point on the map arbitrarily displayed via scroll operation, the position specification section specifies the position and the facilities around that position are retrieved/extracted. The specified position maybe a wide range to some extent. The maximum distance of a target facility from the specified position may be set as a default value or arbitrarily set by the user.

As mentioned earlier, according to the invention, it is possible to provide a navigation apparatus, a navigation method and a navigation software whereby facilities of a plurality of categories near a particular position on a map can be retrieved in a short time and displayed.

What is claimed is:

1. A navigation apparatus comprising:
    a map information storage for electronically storing mapping information to show names of roads and facilities located in respective areas;
    a current position detector for detecting a current position of a vehicle;
    a position specification detector, operably connected to said map information storage and said current position detector, for specifying a second position on a map that is based on the mapping information; and
    a processor, comprising:
        a retrieval section for retrieving facilities of a plurality of categories adjacent to, but not at, the specified second position based on the mapping information;
        an extracting section for extracting retrieved facilities from the retrieval section and for sorting the retrieved facilities by distance to the specified second position;
        a facility display section for displaying the facilities extracted by said extracting section on the map based on the mapping information;
        a route setting section for calculating and setting a route from the current position to a destination by selecting any facility displayed on said facility display section as the destination based on the mapping information; and
        a guidance section for guiding the vehicle along the set route.

2. The navigation apparatus according to claim 1, further comprising:
    category setting section, operably connected to said processor, for setting categories of facilities to be retrieved.

3. The navigation apparatus according to claim 1, wherein the specified second position is optionally set to be the current position of the vehicle.

4. The navigation apparatus according to claim 1, further comprising:
    list display section, operably connected to said processor, for displaying a list of facility category names; and
    a destination setting section, operably connected to said processor, for setting a facility as a destination route by said route setting section based on the category names in the list displayed on said list display section.

5. The navigation apparatus according to claim 4, further comprising:
    a selection section, operably connected to said processor, for selecting a category name in the list displayed on said list display section,
    wherein said facility display section is adapted to display an additional facility that is closest to the current position of the vehicle out of the facilities corresponding to the category names selected by said selection section.

6. A navigation computer method, comprising:
    storing mapping information to show names of roads and facilities located in respective areas;
    detecting a current position of a vehicle;
    specifying any second position on the map that is based on the mapping information;
    retrieving facilities from a plurality of categories around, but not at, the specified second position;
    extracting the retrieved facilities that are sorted by distance to the specified second position;
    displaying facilities extracted by said extracting section on the map based on the mapping information;
    calculating and setting a route from the current position to a destination by selecting any facility displayed as the destination based on the mapping information; and
    guiding the vehicle along the specified route.

7. The navigation computer method according to claim 6, further comprising:
    setting the categories of the facilities to be retrieved.

8. The navigation computer method according to claim 6, wherein:
    the specified second position on the map is optionally set as the current position of the vehicle.

9. A program storage device readable by a machine, tangibly embodying a program of instructions executable by the machine to perform a method for navigation, said method comprising:
    storing mapping information to show names of roads and facilities located in respective areas;
    detecting a current position of a vehicle;
    specifying any second position on a map that is based on the mapping information;
    retrieving facilities of a plurality of categories around, but not at, the specified second position;
    extracting the retrieved facilities, and sorting the retrieved facilities by distance to the specified second position;
    displaying the extracted facilities on the map;
    determining a route from the current position to a destination by selecting a facility displayed as the destination; and
    guiding the vehicle along the determined route.

10. The navigation computer method according to claim 6, further comprising:
    setting the categories, with a category setting section, of facilities for retrieval.

11. The navigation computer method according to claim 6, further comprising:
    setting the specified second position as the current position of the vehicle.

12. The navigation computer method according to claim 6, further comprising:
    displaying, with a list display section, a list of facility category names.

13. The navigation computer method according to claim 12, further comprising:
   setting a facility as a destination route, with a destination setting section, based on the category names in the list displayed on said list display section.

14. The navigation computer method according to claim 12, further comprising:
   selecting, with a selection section, a category name in the list displayed on said list display section.

15. The navigation computer method according to claim 14, further comprising:
   displaying on said list display section, an additional facility that is closest to the current position of the vehicle out of the facilities corresponding to the category names selected by said selection section.

16. The program storage device according to claim 9, further comprising:
   setting the categories, with a category setting section, of facilities for retrieval.

17. The program storage device according to claim 9, further comprising:
   setting the specified second position as the current position of the vehicle.

18. The program storage device according to claim 9, further comprising:
   displaying, with a list display section, a list of facility category names; and
   setting a facility as a destination route, with a destination setting section, based on the category names in the list display on said list display section.

19. The program storage device according to claim 18, further comprising:
   selecting, with a selection section, a category name in the list displayed on said list display section; and
   displaying, on said list display section, an additional facility that is closest to the current position of the vehicle out of the facilities corresponding to the category names selected by said selection section.

20. The navigation apparatus according to claim 1, wherein said extracting section lists said extracted facilities sorted by a distance of each of the facilities from the specified second position.

21. The navigation apparatus according to claim 1, wherein said retrieval section automatically, without user intervention, retrieves the facilities of a plurality of categories adjacent to the specified second position.

22. A navigation apparatus, comprising:
   a map information storage for electronically storing mapping information to show names of roads and facilities located in respective areas;
   a current position detector for detecting a current position of said navigation apparatus;
   a position specification detector, operably connected to said map information storage and said current position detector, for specifying a second position, different from the current position, on a map that is based on the mapping information; and
   a processor, comprising:
      a retrieval section for retrieving facilities of a plurality of categories adjacent to but not at, the specified second position based on the mapping information;
      an extracting section for extracting retrieved facilities from the retrieval section and for sorting the retrieved facilities by distance to the specified second position; and
      a facility display section for displaying the facilities extracted by said extracting section on the map based on the mapping information.

23. The navigation apparatus according to claim 22, further comprising a route setting section for calculating and setting a route from the current position to a destination by selecting any facility displayed on said facility display section as the destination based on the mapping information.

24. A navigation computer method, comprising:
   storing mapping information to show names of roads and facilities located in respective areas;
   detecting a current position of the map computer;
   specifying any second position, different from the current position, on a map that is based on the mapping information;
   retrieving facilities from a plurality of categories around, but not at, the specified second position;
   extracting the retrieved facilities that are sorted by distance to the specified second position; and
   displaying facilities extracted by said extracting section on the map based on the mapping information.

25. The navigation computer method according to claim 24, further comprising calculating and setting a route from the current position to a destination by selecting any facility displayed as the destination based on the mapping information.

26. A program storage device readable by a machine, tangible embodying a program of instructions executable by the machine to perform a method for navigation, said method comprising:
   storing mapping information to show names of roads and facilities located in respective areas;
   detecting a current position;
   specifying any second position, different from the current position, on a map that is based on the mapping information;
   retrieving facilities of a plurality of categories around, but not at, the specified second position;
   extracting the retrieved facilities;
   sorting the retrieved facilities by distance to the specified second position; and
   displaying the extracted facilities on the map.

27. The program storage device according to claim 26, wherein the method further comprises determining a route from the current position to a destination by selecting a facility displayed as the destination.

* * * * *